(12) United States Patent
Handte et al.

(10) Patent No.: US 11,159,273 B2
(45) Date of Patent: Oct. 26, 2021

(54) MAPPING DEVICE AND METHOD, PROBABILISTIC SIGNAL POINT SHAPING DEVICE AND METHOD

(71) Applicant: Sony Corporation, Tokyo (JP)

(72) Inventors: Thomas Handte, Stuttgart (DE); Reka Inovan, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/636,026

(22) PCT Filed: Aug. 17, 2018

(86) PCT No.: PCT/EP2018/072341
§ 371 (c)(1),
(2) Date: Feb. 3, 2020

(87) PCT Pub. No.: WO2019/034780
PCT Pub. Date: Feb. 21, 2019

(65) Prior Publication Data
US 2021/0152285 A1 May 20, 2021

(30) Foreign Application Priority Data
Aug. 17, 2017 (EP) .................................... 17186609

(51) Int. Cl.
*H04L 1/00* (2006.01)
(52) U.S. Cl.
CPC ............ *H04L 1/0071* (2013.01); *H04L 1/005* (2013.01); *H04L 1/0042* (2013.01)
(58) Field of Classification Search
CPC ...... H04L 1/0071; H04L 1/0042; H04L 1/005
See application file for complete search history.

(56) References Cited

U.S. PATENT DOCUMENTS

| 9,768,913 | B1* | 9/2017 | Kwon | ............... H04L 25/03318 |
| 10,069,519 | B1* | 9/2018 | Millar | .................. H03M 13/05 |

(Continued)

FOREIGN PATENT DOCUMENTS

| EP | 1324558 A1 | 2/2003 |
| EP | 3306821 A1 | 2/2003 |
| WO | 2018/121887 A1 | 5/2018 |

OTHER PUBLICATIONS

Bocherer et al., High Throughput Probabilistic Shaping with Product Distribution Matching, Feb. 2017, IEEE, pp. 1-9 (Year: 2017).*

(Continued)

*Primary Examiner* — Freshteh N Aghdam
(74) *Attorney, Agent, or Firm* — Xsensus LLP

(57) ABSTRACT

Circuitry configured to map data blocks of input bits of a first input bit stream onto first mapping symbols distributed according to a first probability distribution and represented by first signal points, analyze the probability of occurrence of the first signal points representing the first mapping symbols and/or earlier final mapping symbols, determine a second probability distribution to be applied for mapping second input bits of a second input bit stream onto second mapping symbols, said second probability distribution determined based on the analyzed probability of occurrence to obtain a desired final probability distribution of final mapping symbols, map data blocks of input bits of a second input bit stream onto second mapping symbols, wherein said second mapping symbols are distributed according to said second probability distribution and represented by second signal points, and combine the first mapping symbols and the second mapping symbols into the final mapping symbols.

20 Claims, 4 Drawing Sheets

(56) References Cited

U.S. PATENT DOCUMENTS

2014/0211880 A1* 7/2014 Sagong .................. H04L 27/14
375/269
2019/0245651 A1* 8/2019 Yuan ..................... H04L 1/0075

OTHER PUBLICATIONS

International Search Report and Written Opinion dated Nov. 20, 2018 for PCT/EP2018/072341 filed on Aug. 17, 2018, 14 pages.
IEEE, "Part 11: Wireless LAN Medium Access Control (MAC) and Physical Layer (PHY) Specifications," IEEE Standard for Information technology—Telecommunications and information exchange between systems Local and metropolitan area networks—Specific requirements, IEEE Std 802.11™—2016, Dec. 7, 2016, pp. 1-3532.
Böcherer, G., "Probabilistic Signal Shaping for Bit-Metric Decoding," 2014 IEEE International Symposium on Information Theory, 2014, pp. 431-435.
Böcherer, G., et al., "Bandwidth Efficient and Rate-Matched Low-Density Parity-Check Coded Modulation," Apr. 2015, pp. 1-13.
Böcherer, G., et al., "Bandwidth Efficient and Rate-Matched Low-Density Parity-Check Coded Modulation," IEEE Transactions on Communications, vol. 63, No. 12, Dec. 2015, pp. 4651-4665.
Böcherer, G., et al., "High Throughput Probabilistic Shaping with Product Distribution Matching," Feb. 2017, pp. 1-9.
Schulte, P. and Böcherer, G., "Constant Composition Distribution Matching," Mar. 17, 2015, pp. 1-5.
Schulte, P. and Böcherer, G., "Constant Composition Distribution Matching," IEEE Transactions on Information Theory, vol. 62, No. 1, Jan. 2016, pp. 430-434.

* cited by examiner

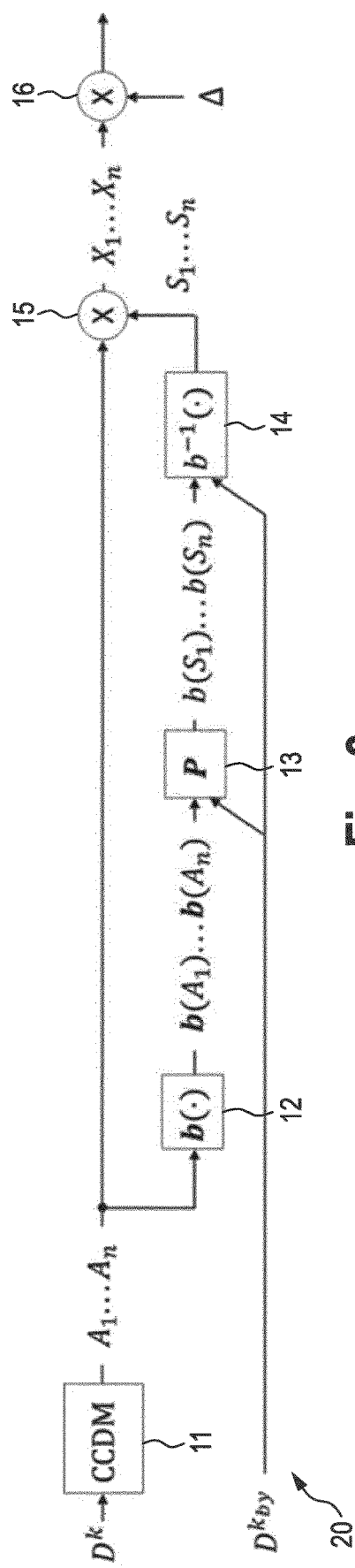
Fig. 3
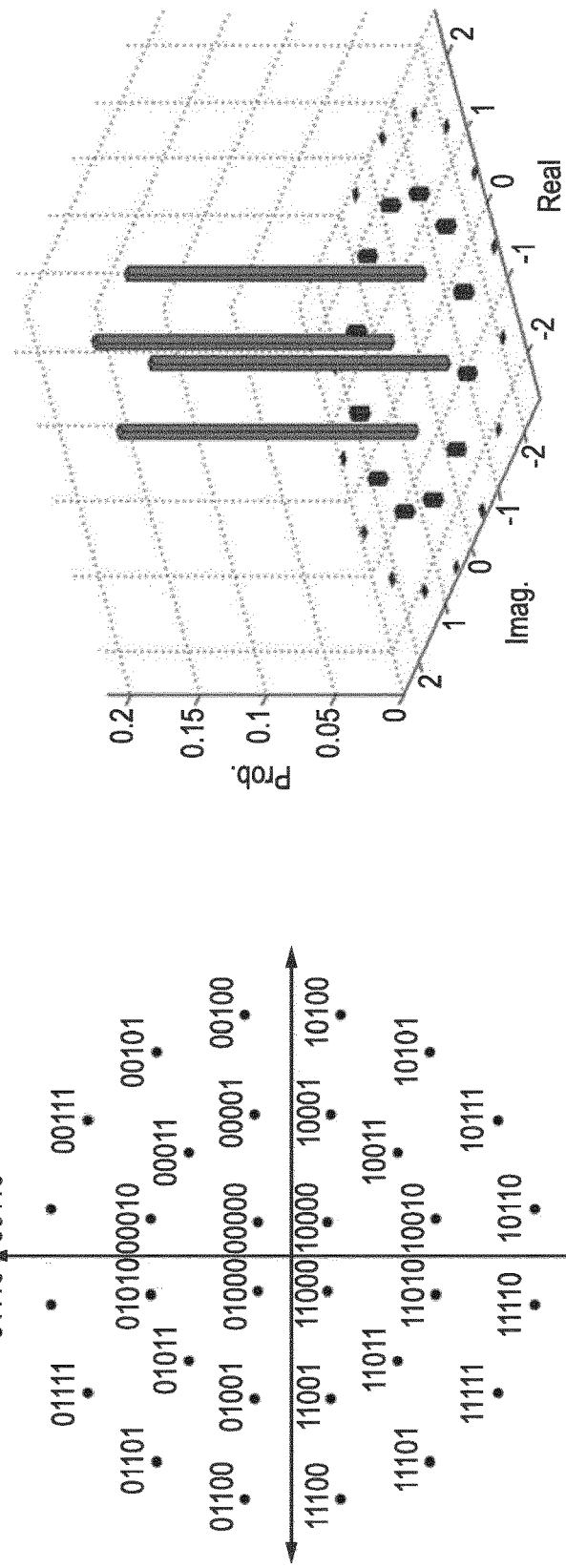
Fig. 4
Fig. 5

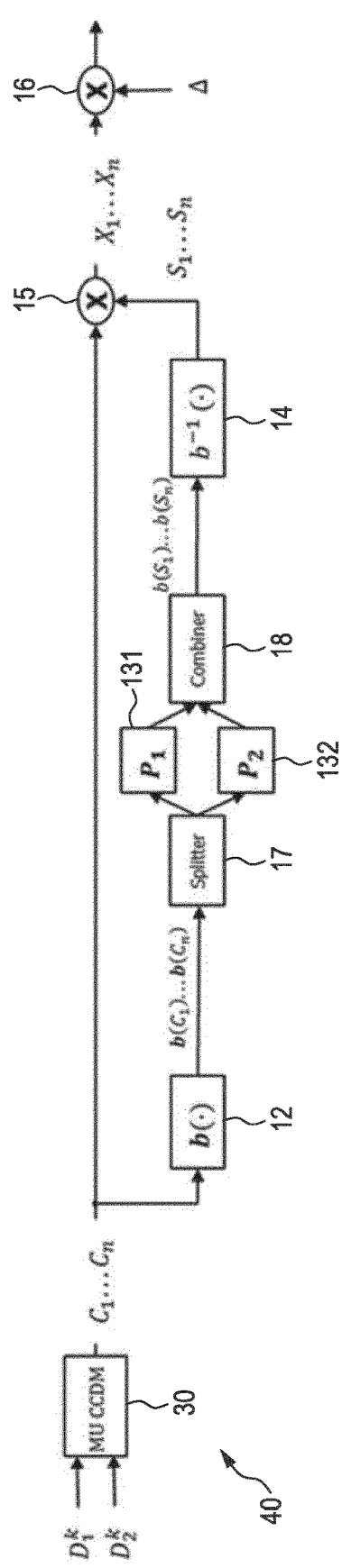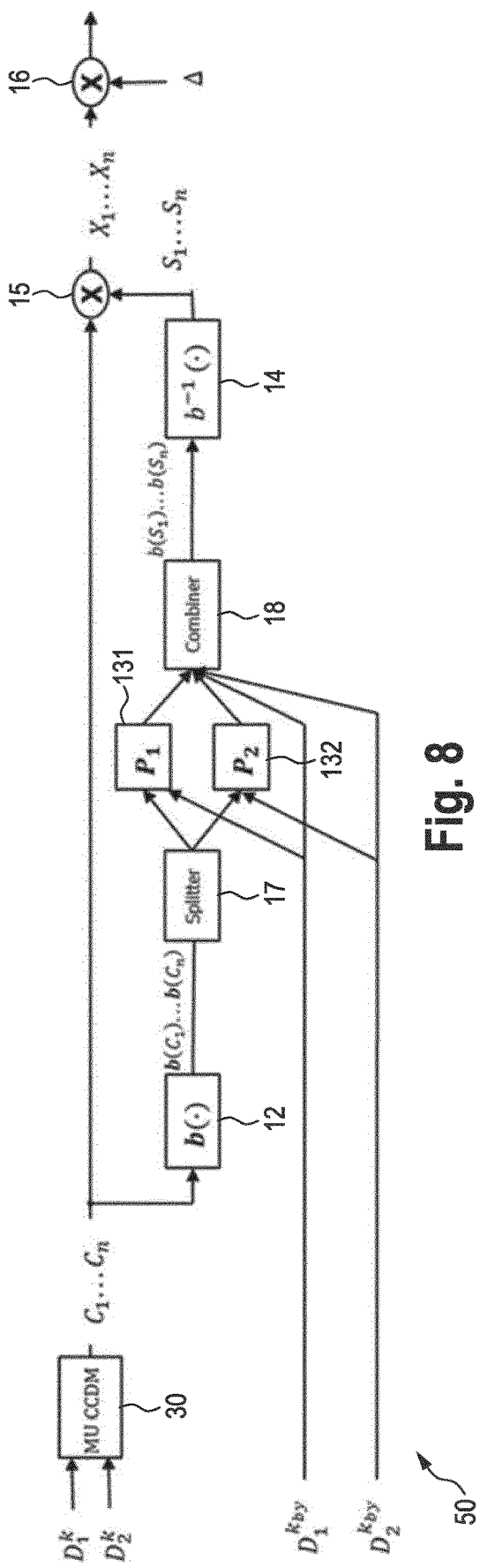

MAPPING DEVICE AND METHOD, PROBABILISTIC SIGNAL POINT SHAPING DEVICE AND METHOD

CROSS-REFERENCE TO RELATED APPLICATIONS

The present application is based on PCT filing PCT/EP2018/072341, filed Aug. 17, 2018, and claims priority to EP 17186609.8, filed Aug. 17, 2017, the entire contents of each are incorporated herein by reference.

BACKGROUND

Field of the Disclosure

The present disclosure relates to a mapping device and method. The present disclosure relates further to a probabilistic signal point shaping device and method using such a mapping device and method.

Description of Related Art

Error free data communications with minimum transmit power has always been and still is an important aspect in communications. It is desired to achieve the Shannon capacity, which is well-known to be the upper bound of bit rate per Hertz of transmit bandwidth for a given signal to noise ratio. The assumptions of Shannon capacity are rather theoretical, however other capacity measures such as bit-interleaved-coded-modulation (BICM) capacity exist which impose a more practical upper bound on bit rate per Hertz.

The BICM capacity is a function of the channel noise model (e.g. AWGN; Additive White Gaussian Noise) and its properties (e.g. probability density function, variance), the signal points (e.g. QAM) and their position within the complex plane (e.g. rectangular 16-QAM), and the probability of occurrence of signal points.

Optimization of BICM capacity is desired to maximize link throughput over a given transmit bandwidth and signal to noise ratio. It can be either achieved by signal point optimization (e.g. non-uniform constellation NUC), by probability optimization, or both.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a mapping device and method as well as a corresponding probabilistic signal point shaping device and method that optimize BICM capacity for a multi-user scenario. It is a further object to provide a corresponding computer program for implementing said methods and a non-transitory computer-readable recording medium for implementing said methods.

According to another aspect there is provided a mapping device comprising circuitry configured to
  map data blocks of input bits of a first input bit stream onto first mapping symbols, wherein said first mapping symbols are distributed according to a first predetermined probability distribution and represented by first signal points,
  analyze the probability of occurrence of the first signal points representing the first mapping symbols and/or earlier final mapping symbols,
  determine a second probability distribution to be applied for mapping second input bits of a second input bit stream onto second mapping symbols, said second probability distribution being determined based on the analyzed probability of occurrence such that a desired final probability distribution of final mapping symbols is obtained,
  map data blocks of input bits of a second input bit stream onto second mapping symbols, wherein said second mapping symbols are distributed according to said second probability distribution and represented by second signal points, and
  combine the first mapping symbols and the second mapping symbols into the final mapping symbols.

According to another aspect there is provided a mapping method comprising
  mapping data blocks of input bits of a first input bit stream onto first mapping symbols, wherein said first mapping symbols are distributed according to a first predetermined probability distribution and represented by first signal points,
  analyzing the probability of occurrence of the first signal points representing the first mapping symbols and/or earlier final mapping symbols,
  determining a second probability distribution to be applied for mapping second input bits of a second input bit stream onto second mapping symbols, said second probability distribution being determined based on the analyzed probability of occurrence such that a desired final probability distribution of final mapping symbols is obtained,
  mapping data blocks of input bits of a second input bit stream onto second mapping symbols, wherein said second mapping symbols are distributed according to said second probability distribution and represented by second signal points, and
  combining the first mapping symbols and the second mapping symbols into the final mapping symbols.

According to another aspect there is provided a probabilistic signal point shaping device comprising a mapping device as disclosed herein and circuitry configured to
  assign bit labels to the final mapping symbols generated by the mapping device,
  determine redundancy bits from the bits of said bit labels,
  transform said redundancy bits into a redundancy rule, and
  applying the redundancy rule to the mapping symbols to obtain output symbols.

According to a further aspect there is provided a probabilistic signal point shaping method comprising
  a mapping method as disclosed herein,
  assigning bit labels to the final mapping symbols generated by the mapping method,
  determining redundancy bits from the bits of said bit labels,
  transforming said redundancy bits into a redundancy rule, and
  applying the redundancy rule to the mapping symbols to obtain output symbols.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed methods, the disclosed computer program and the disclosed computer-readable recording medium have similar and/or identical further embodiments as the claimed device and as defined in the dependent claims and/or disclosed herein.

One of the aspects of the disclosure is to provide a mapping device and method that can be used for a multi-user scenario in which messages shall be transmitted to multiple users. For this purpose a multi-user (MU) operation is disclosed by means of superposition coding.

Further, various enhancements to probabilistic amplitude shaping (PAS), which will be called probabilistic signal point shaping since not only amplitudes (real values of a complex plane, also known as signal point constellation) may shaped, but generally (real-valued or complex-valued) signal points of a signal point constellation. One of the ideas of these enhancements to PAS is to generate a signal point constellation in which the probability of occurrence is non-uniform. It has been shown that this approach comes close to the upper bound of channel capacity measures. In this disclosure further enhancements of the PAS scheme are presented. In particular, simultaneous IQ distribution matching is disclosed, which allows use of signal point constellations combining odd numbers of bits and allows bandwidth efficient communications for channels other than AWGN.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 3 shows a schematic diagram of a second embodiment of a probabilistic signal point shaping device according to the present disclosure, FIG. 4 shows a diagram illustrating mapping onto complex-valued symbols, FIG. 5 shows a diagram illustrating non-uniform probability distribution, FIG. 7 shows a schematic diagram of a second embodiment of a probabilistic signal point shaping device according to the present disclosure, and FIG. 8 shows a schematic diagram of a second embodiment of a probabilistic signal point shaping device according to the present disclosure.

DETAILED DESCRIPTION OF THE EMBODIMENTS

Figure 1:
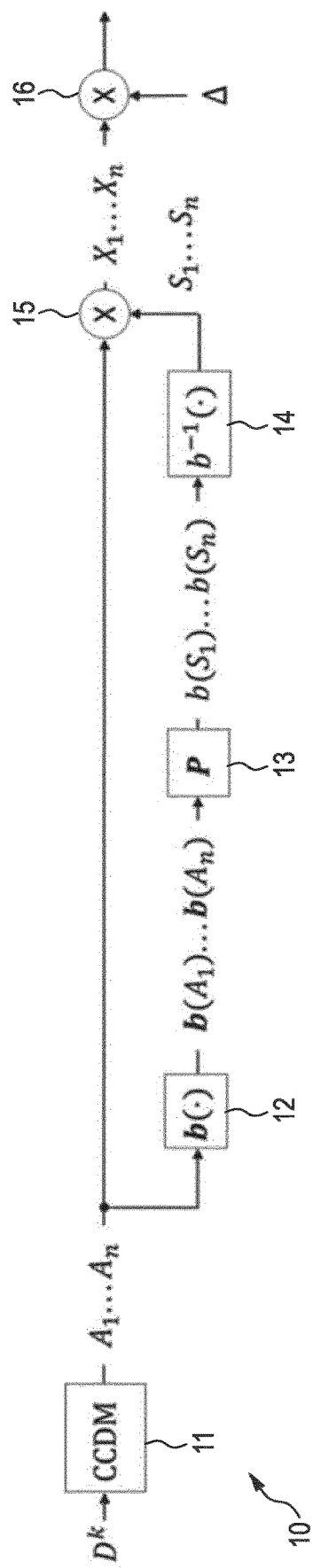
FIG. 1 shows a schematic diagram of a first embodiment of a probabilistic signal point shaping device according to the present disclosure.

Referring now to the drawings, wherein like reference numerals designate identical or corresponding parts throughout the several views, FIG. 1 shows a schematic diagram of a first embodiment of a probabilistic signal point shaping device 10 according to the present disclosure. This device applies a transmission scheme which optimizes the probability of occurrence of signal points. The bit stream to be transmitted is $D^K$ with length K. A constant composition distribution matcher (CCDM) 11 generates n mapping symbols $A_1, \ldots, A_n$ each being assigned to (or represented by) a particular signal point. A CCDM as such is e.g. known from Schulte, P. and Böcherer, G.; "Constant Composition Distribution Matching", IEEE Trans. Inf. Theory, vol. 62, no. 1, pp. 430-434, January 2016.

Figure 2:
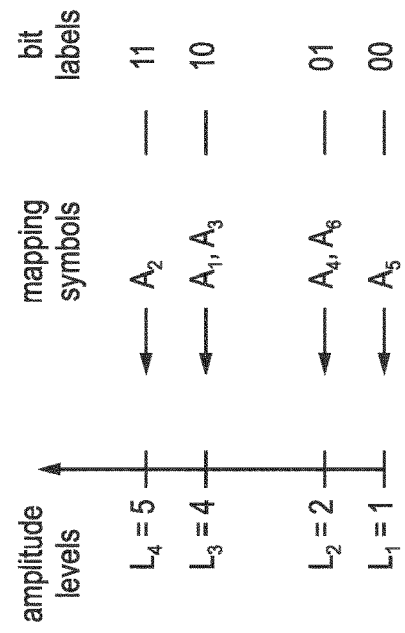
FIG. 2 shows a diagram illustrating mapping onto non-uniformly spaced amplitude levels.

Different from the known CCDM, according to the present disclosure the mapping symbols (generally represented by signal points) are non-uniformly spaced, i.e. the distances between each pair of two neighboring signal points are not equal, if the mapping symbols are real-valued and are represented by amplitude levels. These amplitude levels are non-uniformly spaced as shown in FIG. 2. Here, four different amplitude levels $L_1, \ldots, L_4$ are shown, where amplitude level $L_1=1$, $L_2=2$, $L_3=4$, $L_4=5$, i.e. the distance between amplitude levels $L_2$ and $L_3$ is larger than the difference between $L_1$ and $L_2$ and between $L_3$ and $L_4$. The mapping symbols $A_1, \ldots, A_n$ are non-uniformly distributed onto these four different amplitude level $L_1, \ldots, L_4$ according to a predetermined probability distribution as also indicated in FIG. 2.

In other words, the amplitude levels $L_1, \ldots, L_4$ determine a kind of "alphabet" of the CCDM source, whereas the mapping symbols $A_1, \ldots, A_n$ are different realizations from that CCDM source. When analyzing the mapping symbols, each amplitude level features a certain predetermined probability of occurrence.

Generally, the CCDM 11 (or general circuitry, such as a processor or other hardware) thus maps data blocks of input bits of the input bit stream $D^K$ onto mapping symbols $A_1, \ldots, A_n$, wherein said mapping symbols are taken from non-uniformly spaced signal points, in the example shown in FIG. 2 represented by amplitude levels, according to a predetermined probability distribution.

The probability of occurrence of these amplitude levels approximate a predefined probability distribution (which shall be optimized). The mapping of the data blocks of the input bit stream $D^K$ to signal points is invertible, i.e. the receiver recovers bits from signal points (e.g. amplitude levels) loss less. Each signal point gets assigned a bit combination (also called bit label) by the bit label assigner 12 (block b(.) in FIG. 1) or a corresponding circuitry. Thus, the number N of different amplitude level $L_1, \ldots, L_N$ corresponds to an integer power of 2. For instance, as shown in FIG. 2, four different amplitude levels are used, to which the bit labels 00 (to $L_1$), 01 (to $L_2$), 10 (to $L_3$), and 11 (to $L_4$) are assigned. Hence, depending on the amplitude level, to which a mapping symbol is assigned, a corresponding bit label is assigned to the respective mapping symbol. For instance, since the bit label 10 is assigned to amplitude level $L_3$, the bit label 10 is finally assigned to the mapping symbols $A_1$ and $A_3$. The assigned bit labels are generally referred to as $b(A_1), \ldots, b(A_n)$.

The bits generated by the bit label assigner 12 are passed to a redundancy generator 13 using a parity matrix P which originates from a systematic forward error correction (FEC)

code of a given rate. The redundancy generator 13 uses the P matrix to generate, based on it input bits $b(A_1), \ldots, b(A_n)$ (i.e. the bits of the bit labels), redundancy bits, in this embodiment parity bits $b(S_1), \ldots, b(S_n)$, at its output. Hereby, the P matrix preferably originates from a FEC code with code rate (m−1)/m with m−1 being the number of bits assigned to each mapping symbol.

The parity bits $b(S_1), \ldots, b(S_n)$ are transformed into a redundancy rule by a transforming unit 14 (block $b^{-1}(.)$ in FIG. 1) or a corresponding circuitry. The redundancy rule in this embodiment is a multiplication factor $S_1, \ldots, S_n$ of +1 or −1, i.e. a sign function, but other ways to implement the redundancy rule are well possible, such as a mirroring operation.

The multiplication factor $S_1, \ldots, S_n$ is multiplied in a multiplier 15 or a corresponding circuitry with the mapping symbols $A_1, \ldots, A_n$ output from the constant-composition distribution matcher 11 (CCDM) to generate output symbols $X_1, \ldots, X_n$. In other words, the parity bits influence the sign of the mapping symbols $A_1, \ldots, A_n$.

As a last optional step, multiplication with a scaling factor Δ in scaling unit 16 or a corresponding circuitry rescales output symbols $X_1, \ldots, X_n$ such that desired (e.g. unity) transmit power is achieved. With this optional step the communication rated can be increased considerably.

The CCDM algorithm which is described in the above cited paper of Schulte and Böcherer has three inputs, i.e. bits to be transmitted, desired output symbols and desired probability of occurrence of the output symbols. It generates based on input parameters an output symbol sequence which fulfills the desired probability of occurrence. If output symbols are complex-valued or non-uniform, it will output complex-valued or non-uniform symbols. The operation itself is unchanged compared to the operation described in this paper, which is herein incorporated by reference.

The CCDM as described in this paper may thus be applied as described in this paper, i.e. it outputs real valued and uniform amplitude levels, and a mapping unit may then be attached. This mapping unit performs an invertible one-to-one mapping between real-valued, uniform amplitude levels and complex-valued signal points or non-uniform amplitude levels. For instance, the CCDM alphabet (the amplitude levels) may be 1, 3, 5, 7 and a mapping unit allocates 1 to 1, 3 to 1+j, 5 to 5 and 7 to 2+j. This implements a CCDM with complex-valued output symbols.

The CCDM thus basically works by dividing the [0, 1] intervals into equal length sub-intervals each assigned to one of the constant composition output sequence. Afterwards, equally spaced points positioned on the [0, 1] intervals are each assigned to the input binary sequences. During the distribution matching process, the CCDM will admit an input binary sequence, find its assigned points, find on which sub-intervals the point lies and finally output a constant composition sequence which is assigned to such sub-interval.

FIG. 3 shows a schematic diagram of a second embodiment of a probabilistic signal point shaping device 20 according to the present disclosure. This embodiment enables the use of the P matrix from the FEC with different code rates, i.e. code rate different from (m−1)/m. In this extended scheme, the length of the bypassed data bit $k_{by}$ of another (bypass) input bit stream $D^{K_{by}}$, preferably from the same source, can be matched to the rate of FEC code.

Basically, the additional input bits are appended to the parity generated by the redundancy generator 13. Then, these extended bit sequences are mapped to signs by the transforming unit 14. Care is taken during the design phase to ensure that the length of this extended sequence is equal to the CCDM output. The number of amplitudes preferably matches the number of signs, which imposes restrictions to the code. The idea of additional input bits is to overcome these restrictions. Thus, if the parity matrix is from a code with higher code rate than (m−1)/m, additional bits are used (where $2^{m-1}$ is the number of amplitudes or equivalently m−1 is the number of bits assigned to each mapping symbol).

As an example a P matrix from a code with code rate 1/2 (i.e. no bypass bits needed for two amplitude levels, i.e. the embodiment shown in FIG. 1 may be applied) it shall be assumed that 1000 mapping symbols are output from a source featuring two different amplitude levels (e.g. 1 and 3). The bit label assigner 12 allocates one bit for each amplitude level (e.g. for amplitude level 1 bit label 0 is assigned and for amplitude level 3 bit label 1 is assigned). The redundancy generator 13 generates for each input bit one output bit and the transforming unit 14 does bit to sign mapping (e.g. bit 0 is transformed into sign −1 and bit 1 is transformed into sign +1). The number of mapping symbols (1000) matches the number of signs (1000).

As another example a P matrix from a code with rate 2/3 (i.e. bypass needed for two amplitude levels, i.e. the embodiment shown in FIG. 3 may be applied) shall be considered. The operation is as described above but has a difference at the redundancy generator 13 which generates one output bit for two input bits. In order to match sign output to amplitude levels bypass bits are used. Assuming x bits are from the input bit stream $D^K$ and y bits are from the bypass bit stream $D^{K_{by}}$, both are concatenated before the redundancy generation, i.e. x+y bits are input into the redundancy generator 13. After the redundancy generator 13 x/2+y/2+y bits are given (+y comes from concatenation with bypass bits). As the number of bits after the redundancy generator 13 shall match the number of amplitude levels, a condition for x and y can be given by $$\frac{x+y}{2} + y = x$$

which results in 3y=x. The actual value of x and y depends on the block length of the P matrix such that the number of data bit in the parity matrix is equal to x+y. This constraint induces a system of linear equations that can be used to find a specific integer x and y which is matched to the property of the parity matrix P.

In the above described exemplary embodiments non-uniformly spaced amplitude levels are applied for the CCDM output, i.e. at least one distance between two neighboring signal points is different from all other distances between neighboring signal points. If the PAS scheme explained above is applied component-wise, e.g. I and Q component independently, the constellation seen on the channel is of non-uniform type.

For channels other than AWGN or for constellation sizes $2^x$ with X being an odd number, the separation of a 2D constellation into two 1D constellations is either not optimal (i.e. it does not achieve optimum channel capacity) or it is not possible (i.e. each 1D constellation projection would comprise a number of signal points which is different from a power of two). For those cases, more flexibility with respect to signal point position and probability of occurrence of signal points is beneficial.

Thus, it is proposed in further embodiments that the CCDM output defines complex-valued signal points, each associated with a probability of occurrence, i.e. the CCDM maps the data blocks of input bits of the input bit stream onto complex-valued mapping symbols, wherein said complex-valued mapping symbols are uniformly or non-uniformly spaced and represented by complex-valued signal points of a signal point constellation. At least one signal point is required to have a distance to its closest neighbor which is different from all other signal point distances to closest neighbors. The complex-valued signal points reside within a defined interval in the complex plane. The encoding scheme is equivalent up to the transforming unit 14 (the $b^{-1}(.)$ device), i.e. the layout of the embodiments shown in FIGS. 1 and 3 also holds for these embodiments. For the proposed scheme to work, the transforming unit 14 allocates to an input bit combination an interval of the complex plane. This interval defines the actual location of the associated complex valued signal point generated by the CCDM 11.

For the mapping onto complex-valued symbols sequences are first created in which the proportions of each symbol in the sequence satisfy the probability distribution. Then arithmetic coding scheme is used to map uniform bit input to these sequences.

Various implementations of the aforementioned procedure are conceivable.

a) In a first implementation, the CCDM 11 defines complex-valued signal points within a quadrant, i.e. Re>0 and Im>0. The transforming unit 14 considers a group of two of its input bits and assigns a quadrant to the signal points defined by CCDM 11. An exemplary mapping table is shown in Table 1.

TABLE 1

| Input | Output |
| --- | --- |
| 00 | First quadrant (Re >0, Im >0) |
| 01 | Second quadrant (Re <0, Im >0) |
| 10 | Third quadrant (Re <0, Im <0) |
| 11 | Fourth quadrant (Re >0, Im <0) |

The transforming unit 14 thus transforms said redundancy bits into a phase rotation function and/or an amplitude multiplication function as redundancy rule, in this implementation a phase rotation function for rotation by 0°, 90°, 180° or 270°.

b) In another implementation, the CCDM 11 defines complex-valued signal points within an octant, i.e. all signal points reside in 0≤arg(·)<π/4 where arg(·) gives the angular orientation of a complex number in the complex plane in radians. The transforming unit 14 considers a group of three of its input bits and interprets this number as an integer p ranging from 0 to 7. The phase rotation applied to each output signal point of the CCDM is exemplarily given by $\varphi_0 = p\pi/4$.

c) In still another implementation, the CCDM 11 defines real-valued signal points, i.e. all signal points reside on the real axis. The transforming unit 14 considers a group of its input bits and interprets this number as a phase rotation as in implementation b). An exemplary phase rotation is given by $\varphi_0 = p\pi/4$ with integer p ranging from 0 to 7. The constellation has a regular geometry in a magnitude-phase or polar diagram, whereas it is star-shaped (or has concentric circles) in a Cartesian diagram.

Any complex-valued signal points can be represented in a magnitude-phase/polar or a Cartesian diagram. The relation between both representations is as shown below. The magnitude of a signal point x is defined as follows:

$$|x| = \sqrt{Re\{x\}^2 + Im\{x\}_2}$$

which can be interpreted to be the distance from the origin of the constellation or IQ diagram to signal point x.

The phase of a signal point x is defined by $$\varphi = \arg(x) = \tan^{-1}\left[\frac{Im\{x\}}{Re\{x\}}\right] + \begin{cases} 0 & \text{if } Re\{x\} \geq 0 \\ \pi & \text{if } Re\{x\} < 0 \text{ and } Im\{x\} \geq 0 \\ -\pi & \text{if } Re\{x\} < 0 \text{ and } Im\{x\} < 0 \end{cases}$$

where it is assumed that $\tan^{-1}[x]$ saturates at π/2 for x→∞ and −π/2 for x→∞, respectively.

Any complex signal point x has a Cartesian (IQ) and a polar representation which is equivalent:

$$x = Re\{x\} + i \cdot Im\{x\}$$

$$x = |x| \cdot e^{i \cdot \arg(x)} = |x| \cdot \{\cos[\arg(x)] + i \cdot \sin[\arg(x)]\}$$

It can been shown that certain constellations which maximize the BICM shaping gain by varying signal point location under the assumption of equal probability of occurrence are also suitable for any PAS scheme, where the probability of occurrence of signal points can be different.

FIG. 4 shows a non-uniform constellation generated by the implementation example a). FIG. 5 the probability of occurrence for each signal point showing that, in this example, inner signal points are more frequently transmitted than outer signal points.

The above described embodiments enable the disclosed probabilistic signal point shaping scheme to support a non-uniform constellation which achieves higher capacity in channels other than AWGN and further enable mapping of non-separable constellations, i.e. where the number of signal points is $2^x$ with X being odd (e.g. 32-QAM).

The above described scheme can be extended to a multi-user (MU) scenario. This scenario arises for example when a WLAN Access Point communicates with more than one user. Each user might have different path loss. It is theoretically known that it is possible to achieve higher communication rate if it is communicated with those users at the same time, although no practical method is offered in theory.

Figure 6:
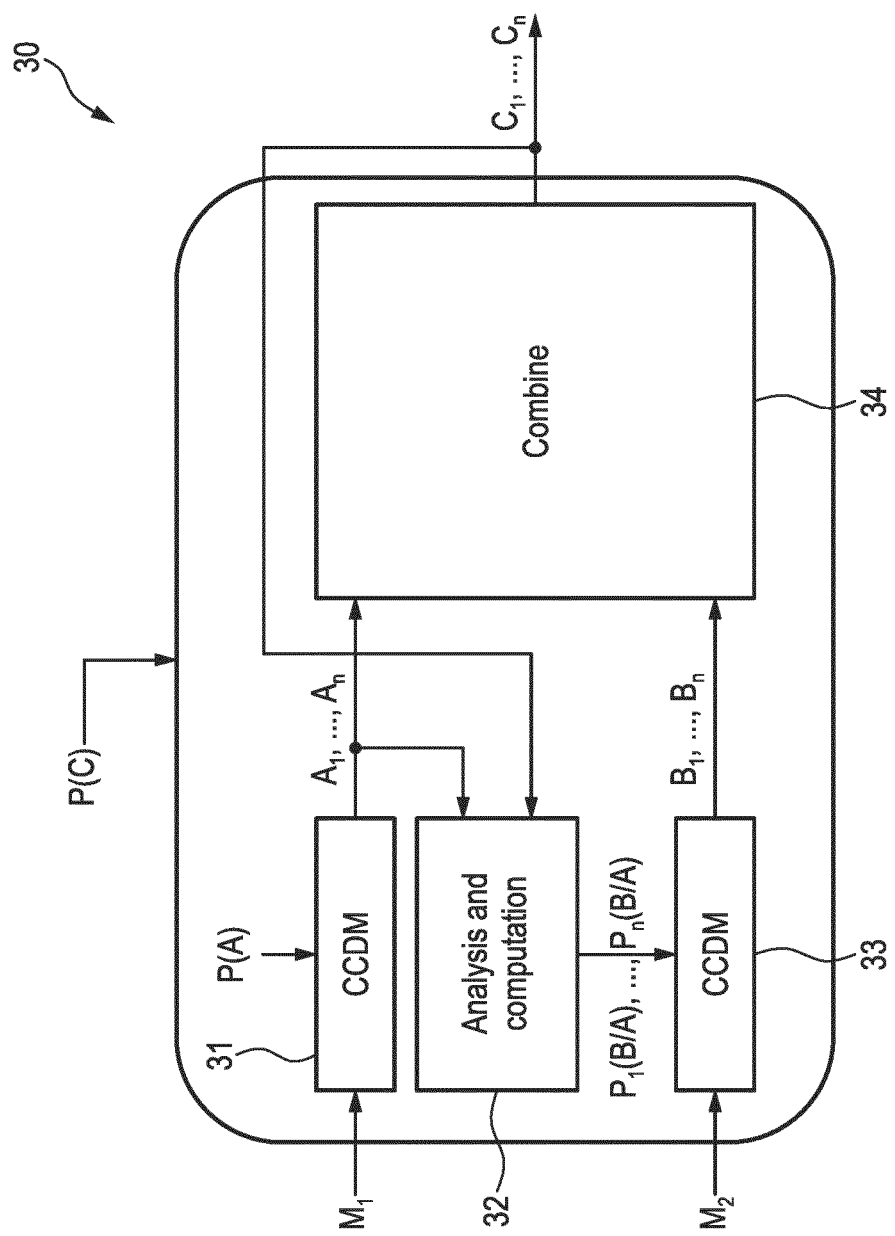
FIG. 6 shows a schematic diagram of another embodiment of a mapping device according to the present disclosure.

Another proposed embodiment is based on staged encoding. On each stage, more messages are added to the candidate transmission sequence. Without loss of generality, this will be illustrated by an example of having two users. Communication at the same time between users is achieved by providing joint constellation based on superposition for both users. Each user gets assigned specific bit label positions depending on the capacity considering their respective path loss. The generation of the final transmission sequence by the device is performed in two stages and one combining stage as will be explained below. FIG. 6 shows a schematic diagram of an embodiment of a mapping device 30 according to the present disclosure for use in a multi-user scenario.

Generally, on a first stage, the message for a user with higher path loss is encoded by a first distribution matcher (CCDM) with a predefined probability of occurrence P(A). On the second stage as well as the already generated output symbols, the encoder takes into account the result of the first stage encoding and changes the probability of occurrence of its amplitude levels for the transmitted sequence accordingly. In the combining stage, both amplitudes are linearly combined, i.e. by means of addition and multiplication. The stage concept can be generalized for the scenario with U users. In this case, the mapping symbols are encoded in U stages and combined in one combining stage.

FIG. 6 shows a multi-user CCDM 30 for two users, which replaces the single-user CCDM 11 in the embodiments of the probabilistic signal point shaping device 10, 20 shown in FIGS. 1 and 2. In the following, a more detailed description of the operation of the MU CCDM 30 is given. The same concept can also be applied for more than two users.

The message $M_1$ intended for the first user is given to a first CCDM 31, which operates with a defined P(A) and generates first output mapping symbols $A_1, \ldots, A_n$. The probability of occurrence of those output mapping symbols as well as the (already generated) output mapping symbols is analyzed by an analysis unit 32 (or corresponding circuitry) and $P_t(B|A)$ with $1 \leq t \leq n$ is computed such that the desired output probability of occurrence P(C) is achieved. The second CCDM 33, which encodes message $M_2$ for user 2, operates with $P_t(B|A)$ and generates second output mapping symbols $B_1, \ldots, B_n$. Note that the second CCDM 33 has a time-variant input distribution $P_t(B|A)$ which means that each output mapping symbol $B_t$ is generated by a specific target distribution $P_t(B|A)$. After $B_t$ is generated, the next $P_{t+1}(B|A)$ is computed which generates $B_{t+1}$ and so forth. The combination unit 34 (or corresponding circuitry) combines the first output mapping symbols $A_1, \ldots, A_n$ and the second output mapping symbols $B_1, \ldots, B_n$, e.g. computes a time-invariant and invertible linear combination (i.e. amplitude multiplication and addition) of both mapping symbols.

In an embodiment the "alphabet" of C will be decomposed in term of the "alphabets" of A and B. Let the number of pair x in A and y in B be written as N_{x,y}. The number of symbols that are already emitted up to time entries i is N_{x,y}[i]. Then the probability observed at time entries i P(y'|x)[i]=N_{x,y}[i]/Z with Z=sum N(x,y') over y'.

The analysis and computation unit considers the value of $A_1, \ldots, A_n$ each being a subset of amplitudes levels (or complex signal points). At point in time t with $1 \leq t \leq n$, the unit counts the number of occurrence of each particular amplitude level within the interval [1, t] which is represented by $H_t(A)$. Based on this an empirical and instantaneous $P_t(A)$ is computed which is $$P_t(A) = \frac{P(A) \cdot n - H_t(A)}{n - t}.$$

$P_t(A)$ can be seen as an instantaneous target distribution function which consider the actual target P(A) and the history of previous first mapping symbols up to point in time t, i.e. $A_1, \ldots, A_t$. Furthermore, the analysis and computation unit considers the value of $C_1, \ldots, C_n$. At point in time t, the unit counts the number of occurrence of each particular amplitude level within the interval [1, t] which is represented by $H_t(C)$. Based on this, an empirical and instantaneous $P_t(C)$ is computed which is $$P_t(C) = \frac{P(C) \cdot n - H_t(C)}{n - t}.$$

Next step is to compute instantaneous target distribution for second CCDM which is $$P_t(B|A) = \frac{P_{t-1}(C)}{P_t(A)}$$

where $P_{t=0}(C) = P(C)$. Note that with every new output a point in time t, the above procedure is repeated unit the last $B_n$ and $C_n$ is computed.

The MU CCDM 30 thus generates output mapping symbols $C_1, \ldots, C_n$ which follows a target output probability distribution P(C). The output probability distribution P(C) is given and optimized for specific channel conditions. The first probability distribution P(A) can be chosen arbitrarily but in such a way that the computed probability distributions $P_t(B|A)$ exists which generates the desired output distribution P(C). Some choices of P(A) are more beneficial for practical purpose, for example if P(A) is mapped according to the probability of the most robust bit, then it will be easier to perform log-likelihood-ratio (LLR) calculation at the receiver.

In the MU CCDM 30 the first CCDM 31 and/or the second CCDM 33 may be configured like the SU CCDM 11 shown in FIGS. 1 and 2 and explained above, i.e. one or both of them may be configured to map data blocks of input bits of an input bit stream onto mapping symbols, wherein said mapping symbols are distributed according to a predetermined probability distribution and represented by complex-valued signal points or non-uniformly spaced amplitude levels. In other embodiments the first CCDM 31 and/or the second CCDM 33 may be configured differently, e.g. as described in the above cited paper of Schulte and Böcherer, i.e. one or both of them may be configured to map data blocks of input bits of an input bit stream onto mapping symbols, wherein said mapping symbols are distributed according to a predetermined probability distribution and represented by uniformly spaced amplitude levels.

Further, the mapping of the data blocks of the input bits of the respective input bit streams of the CCDMs 31 and 33 may be identical or different. For instance, the data blocks of both input bit streams may be mapped onto complex-valued mapping symbols or onto real-valued amplitude levels. In other embodiments the data blocks of the first input bit stream may be mapped onto complex-valued mapping symbols and the data blocks of the second input bit stream may be mapped onto real-valued amplitude levels.

Still further, the data blocks of input bits of the first input bit stream may be mapped onto complex-valued first mapping symbols arranged in a first predetermined area of the complex plane and the data blocks of input bits of the second input bit stream may be mapped onto complex-valued second mapping symbols arranged in a second predetermined area of the complex plane. Hereby, the first and second predetermined areas are preferably different, but may generally also be overlapping or identical.

Hereby, the data blocks of input bits of the first input bit stream may be mapped onto complex-valued first mapping symbols having a phase in a first predetermined range and/or an amplitude in a first predetermined range (e.g. in a quadrant or octant) to map the data blocks of input bits of the second input bit stream may be mapped onto complex-valued second mapping symbols having a phase in a second predetermined range and/or an amplitude in a second predetermined range. Again, the first and second predetermined ranges are preferably different, but may generally also be overlapping or identical.

For improved performance if channel conditions for user 1 and user 2 are substantially different, two P matrices (and two redundancy generators 131, 132) are applicable as shown in the embodiments of a probabilistic signal point shaping device 40 and 50 according to the present disclosure depicted in FIGS. 7 and 8. Before the redundancy generators 131, 132, there is a splitter 17 which separates bits belonging to user 1 and user 2, respectively. Each bit stream is subsequently passed through an individual redundancy generator 131, 132, each applying a separate P matrix, i.e. there are now two P matrices P1 and P2, one for each user. After the individual redundancy generators 131, 132 a combiner 18 reunifies both bit streams. The remaining processing is substantially identical as illustrated above with respect to FIGS. 1 and 3, except that the MU CCDM 30 is required as illustrated in FIG. 6. The use of different redundancy generators 131, 132 and two P matrices P1 and P2 is optional but beneficial if e.g. channel conditions are unequal between users.

The multi-user mapping device may thus also be realized by circuitry configured to:
 map data blocks of input bits of a first input bit stream onto first mapping symbols, wherein said first mapping symbols are distributed according to a first predetermined probability distribution and represented by first signal points,
 analyze the probability of occurrence of the first signal points representing the first mapping symbols and earlier (previously emitted) final mapping symbols,
 determine and/or update a second probability distribution to be applied for mapping second input bits of a second input bit stream onto second mapping symbols, said second probability distribution being determined based on the analyzed probability of occurrence such that a desired final probability distribution of final mapping symbols is obtained,
 map data blocks of input bits of a second input bit stream onto second mapping symbols, wherein said second mapping symbols are distributed according to said second probability distribution and represented by second signal points, and
 combine the first mapping symbols and the second mapping symbols into the final mapping symbols.

The analysis of the probability of occurrence of the first signal points of the first mapping symbols and earlier (i.e. previously emitted) final mapping symbols may be made by
 counting the number of each first signal points and each earlier final mapping symbols, and
 determining or updating the second probability distribution by considering the said count of first mapping symbols and earlier final mapping symbols.

The second probability distribution may hereby be determined by dividing each computed probability of occurrence of the final mapping symbols by the probability of occurrence of the associated first signal point of the first mapping symbols, wherein the association is determined by a combination rule defining combination of first and second mappings symbols.

An example is provided in the following to illustrate the multi-user operation in the scheme as illustrated in FIGS. 7 and 8. Two users shall be assumed in this example. User 1 has amplitude levels $u_1=\{1,3\}$ whereas user 2 has amplitude levels $u_2=\{1,3,5,7\}$. The combiner 34 computes $u_2+4 \cdot u_1-4$. During the design process the probability of occurrence of the output symbols and the bit level assignment is defined. Both is shown in Table 2. In more detail, the first bit is assigned to user 1 and the second and third bits are assigned to user 2.

TABLE 2

| Amplitude | Bit encoding | P (Amplitude) | P (Amplitude) |
|---|---|---|---|
| 1 | 000 | 1/3 | $P[u_2=1|u_1=1] \cdot P[u_1=1]$ |
| 3 | 001 | 2/9 | $P[u_2=3|u_1=1] \cdot P[u_1=1]$ |
| 5 | 010 | 2/9 | $P[u_2=5|u_1=1] \cdot P[u_1=1]$ |
| 7 | 011 | 1/9 | $P[u_2=7|u_1=1] \cdot P[u_1=1]$ |
| 9 | 100 | 1/9 | $P[u_2=1|u_1=3] \cdot P[u_1=3]$ |
| 11 | 101 | 0 | $P[u_2=3|u_1=3] \cdot P[u_1=3]$ |
| 13 | 110 | 0 | $P[u_2=5|u_1=3] \cdot P[u_1=3]$ |
| 15 | 111 | 0 | $P[u_2=7|u_1=3] \cdot P[u_1=3]$ |

As an example, the amplitude levels and the output stream after bit labelling by the bit labelling unit 12 are:
 amplitude levels: (9, 7, 3, 1, 3, 5, 5, 1, 1)
 bit labels: (100,011,001,000,001,010,010,000,000).
The splitter 17 will split the output stream into two streams:
 User 1 for 131: (1,0,0,0,0,0,0,0,0) (each most significant bit of input bit label)
 User 2 for 132: (00,11,01,00,01,10,10,00,00) (both least significant bits of input bit label).
Assuming that the redundancy generators 131, 132 are designed such that the output given the input streams is equal to:
 Output of 131: (0,1,0)
 Output of 132: (1,0,0,1,0,1).
Then possible outputs of the combiner 18 would be:
 combiner output=(0,1,0,1,0,0,1,0,1) or
 combiner output=(0,1,0,1,0,1,0,0,1).
The arrangement of the bit combiner output is arbitrary and irrelevant, as long as it is known and the same on the receiver and the transmitter. This output will be converted into sign and multiplied with the output stream of the CCDM 30 to generate the transmitter output. The number of combiner output bits may be designed to match the number of amplitude levels (both are 9 in this example).

Further, the bit label assignments into streams are not necessarily disjoint. It is possible to have an overlap. This overlapping assignment may help in some embodiments, e.g. to match the FEC code frame size, to allow successive decoding on the receiver, etc.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A mapping device comprising circuitry configured to:
   map data blocks of input bits of a first input bit stream onto first mapping symbols, wherein said first mapping symbols are distributed according to a first predetermined probability distribution and represented by first signal points,
   analyze the probability of occurrence of the first signal points representing the first mapping symbols and/or earlier final mapping symbols,
   determine a second probability distribution to be applied for mapping second input bits of a second input bit stream onto second mapping symbols, said second probability distribution being determined based on the analyzed probability of occurrence such that a desired final probability distribution of final mapping symbols is obtained,
   map data blocks of input bits of a second input bit stream onto second mapping symbols, wherein said second mapping symbols are distributed according to said second probability distribution and represented by second signal points, and
   combine the first mapping symbols and the second mapping symbols into the final mapping symbols.

2. The mapping device as defined in embodiment 1, wherein said circuitry is configured to configured to analyze the probability of occurrence of the first signal points of the first mapping symbols and/or earlier final mapping symbols by
   counting the number of each first signal points and each earlier final mapping symbol, and
   determining or updating the second probability distribution by considering the said count of first mapping symbols and/or earlier final mapping symbols.

3. The mapping device as defined in any preceding embodiment,
wherein said circuitry is configured to determine the second probability distribution by dividing each computed probability of occurrence of the final mapping symbols by the probability of occurrence of the associated first signal point of the first mapping symbols, wherein the association is determined by a combination rule defining combination of first and second mappings symbols.

4. The mapping device as defined in any preceding embodiment,
wherein said circuitry is configured to map the data blocks of the input bits of the first input bit stream onto real-valued first signal points and to map the data blocks of the input bits of the second input bit stream onto real-valued second signal points.

5. The mapping device as defined in embodiment 4,
wherein said real-valued first mapping symbols are represented by non-uniformly spaced first amplitude levels and said real-valued second mapping symbols are represented by non-uniformly spaced second amplitude levels.

6. The mapping device as defined in any preceding embodiment,
wherein said circuitry is configured to map the data blocks of the input bits of the first input bit stream onto complex-valued mapping symbols and to map the data blocks of the input bits of the second input bit stream onto complex-valued second mapping symbols.

7. The mapping device as defined in embodiment 6,
wherein said complex-valued first mapping symbols are represented by non-uniformly spaced complex-valued first signal points of a signal point constellation and said complex-valued second mapping symbols are represented by non-uniformly spaced complex-valued second signal points of said signal point constellation.

8. The mapping device as defined in embodiment 6 or 7,
wherein said circuitry is configured to map the data blocks of input bits of the first input bit stream onto complex-valued first mapping symbols arranged in a first predetermined area of the complex plane and map the data blocks of input bits of the second input bit stream onto complex-valued second mapping symbols arranged in a second predetermined area of the complex plane.

9. The mapping device as defined in embodiment 8,
wherein said circuitry is configured to map the data blocks of input bits of the first input bit stream onto complex-valued first mapping symbols having a phase in a first predetermined range and/or an amplitude in a first predetermined range to map the data blocks of input bits of the second input bit stream onto complex-valued second mapping symbols having a phase in a second predetermined range and/or an amplitude in a second predetermined range.

10. The mapping device as defined in embodiment 8 or 9,
wherein said circuitry is configured to map the data blocks of input bits of the first input bit stream onto complex-valued first mapping symbols arranged in a quadrant or octant and to map the data blocks of input bits of the second input bit stream onto complex-valued second mapping symbols arranged in a quadrant or octant.

11. The mapping device as defined in any preceding embodiment,
wherein said circuitry is configured to combine the mapping symbols and the second mapping symbols by an invertible linear combination.

12. The mapping device as defined in any preceding embodiment,
wherein said circuitry is configured to map data blocks of further input bit streams onto further mapping symbols, wherein said further mapping symbols are represented by further signal points and distributed according to a further probability distribution that is determined from an analysis of the probability of occurrence of the signal points of one or more other mapping symbols and/or probability of occurrence of the earlier final mapping symbols.

13. A mapping method comprising
   mapping data blocks of input bits of a first input bit stream onto first mapping symbols, wherein said first mapping symbols are distributed according to a first predetermined probability distribution and represented by first signal points, analyzing the probability of occurrence of the first signal points representing the first mapping symbols and/or earlier final mapping symbols, determining a second probability distribution to be applied for mapping second input bits of a second input bit stream onto second mapping symbols, said second probability distribution being determined based on the analyzed probability of occurrence such that a desired final probability distribution of final mapping symbols is obtained, mapping data blocks of input bits of a second input bit stream onto second mapping symbols, wherein said second mapping symbols are distributed according to said second probability distribution and represented by second signal points, and combining the first mapping symbols and the second mapping symbols into the final mapping symbols.

14. A probabilistic signal point shaping device comprising a mapping device as defined in any one of embodiments 1 to 13 and circuitry configured to:

assign bit labels to the final mapping symbols generated by the mapping device, determine redundancy bits from the bits of said bit labels, transform said redundancy bits into a redundancy rule, and applying the redundancy rule to the mapping symbols to obtain output symbols.

15. The probabilistic signal point shaping device as defined in embodiment 14, wherein said circuitry is configured to transform said redundancy bits into a multiplication factor of +1 or −1 as redundancy rule.

16. The probabilistic signal point shaping device as defined in embodiment 14, wherein said circuitry is configured to transform said redundancy bits into a phase rotation function and/or an amplitude multiplication function and/or a mirroring function as redundancy rule.

17. The probabilistic signal point shaping device as defined in embodiment 14, wherein said circuitry is configured to determine redundancy bits from the bits of said bit labels and additional input bit and/or to multiply the output symbols with a scaling factor to obtain unity transmit power.

18. The probabilistic signal point shaping device as defined in any one of embodiments 14 to 17, wherein said circuitry is configured to assign bit labels to said final mapping symbols, split bits of the bit labels of the final mapping symbols into a first bit stream comprising first bit labels of the mapping symbols and a second bit stream comprising second bit labels of the second mapping symbols, determine first redundancy bits from the first bit stream and second redundancy bits from the second bit stream, combine the first redundancy bits and the second redundancy bits into combined redundancy bits, and transform said combined redundancy bits into the redundancy rule.

19. A probabilistic signal point shaping method comprising a mapping method as defined in embodiment 13, assigning bit labels to the final mapping symbols generated by the mapping device, determining redundancy bits from the bits of said bit labels, transforming said redundancy bits into a redundancy rule, and applying the redundancy rule to the mapping symbols to obtain output symbols.

20. A non-transitory computer-readable recording medium that stores therein a computer program product, which, when executed by a processor, causes the method according to embodiment 13 or 19 to be performed.

21. A computer program comprising program code means for causing a computer to perform the steps of said method according to embodiment 13 or 19 when said computer program is carried out on a computer.

A1. A probabilistic signal point shaping device comprising circuitry configured to:

map data blocks of input bits of an input bit stream onto mapping symbols, wherein wherein said mapping symbols are distributed according to a predetermined probability distribution and represented by complex-valued signal points or non-uniformly spaced amplitude levels, assign bit labels to said mapping symbols, determine redundancy bits from the bits of said bit labels, transform said redundancy bits into a redundancy rule, and apply the redundancy rule to the mapping symbols to obtain output symbols.

A2. The probabilistic signal point shaping device as defined in embodiment A1, wherein said circuitry is configured to map data blocks of input bits of an input bit stream onto real-valued mapping symbols, wherein said real-valued mapping symbols are represented by non-uniformly spaced amplitude levels.

A3. The probabilistic signal point shaping device as defined in any one of embodiments A1-A2, wherein said circuitry is configured to transform said redundancy bits into a multiplication factor of +1 or −1 as redundancy rule.

A4. The probabilistic signal point shaping device as defined in any one of embodiments A1-A3, wherein said circuitry is configured to map the data blocks of input bits of the input bit stream onto complex-valued mapping symbols, wherein said complex-valued mapping symbols are represented by non-uniformly complex-valued signal points of a signal point constellation.

A5. The probabilistic signal point shaping device as defined in embodiment 4, wherein said circuitry is configured to transform said redundancy bits into a phase rotation function and/or an amplitude multiplication function and/or a mirroring function as redundancy rule.

A6. The probabilistic signal point shaping device as defined in embodiment A4 or A5, wherein said circuitry is configured to map the data blocks of input bits of the input bit stream onto complex-valued mapping symbols arranged in a predetermined area of the complex plane.

A7. The probabilistic signal point shaping device as defined in any one of embodiments A4 to A6, wherein said circuitry is configured to map the data blocks of input bits of the input bit stream onto complex-valued mapping symbols having a phase in a predetermined range and/or an amplitude in a predetermined range.

A8. The probabilistic signal point shaping device as defined in any one of embodiments A4 to A7, wherein said circuitry is configured to map the data blocks of input bits of the input bit stream onto complex-valued mapping symbols arranged in a quadrant or octant.

A9. The probabilistic signal point shaping device as defined in any one of embodiments A1-A8, wherein said circuitry is configured to determine redundancy bits from the bits of said bit labels and additional input bits.

A10. The probabilistic signal point shaping device as defined in any one of embodiments A1-A9,
wherein said circuitry is configured to multiply the output symbols with a scaling factor to obtain unity transmit power.

A11. The probabilistic signal point shaping device as defined in any one of embodiments A1-A10,
wherein said circuitry is configured to
analyze the probability of occurrence of the non-uniformly spaced mapping symbols and/or earlier final mapping symbols,
determine a second probability distribution to be applied for mapping second input bits of a second input bit stream onto second mapping symbols, said second probability distribution being determined based on the analyzed probability of occurrence such that a desired final probability distribution of final mapping symbols is obtained,
map data blocks of input bits of a second input bit stream onto second mapping symbols, wherein said second mapping symbols are distributed according to said second probability distribution and represented by complex-valued signal points or non-uniformly spaced amplitude levels, and
combine the mapping symbols and the second mapping symbols into the final mapping symbols.

A12. The probabilistic signal point shaping device as defined in embodiment A11, wherein said circuitry is configured to configured to map the data blocks of the input bits of the input bit stream onto complex-valued mapping symbols and to map the data blocks of the input bits of the second input bit stream onto complex-valued second mapping symbols.

A13. The probabilistic signal point shaping device as defined in embodiment A11 or A12,
wherein said circuitry is configured to combine the mapping symbols and the second mapping symbols by an invertible linear combination.

A14. The probabilistic signal point shaping device as defined in any one of embodiments A11 to A13,
wherein said circuitry is configured to map data blocks of further input bits of further input bit streams onto further mapping symbols, wherein said further mapping symbols are distributed according to a further probability distribution that is determined from an analysis of the probability of occurrence of the signal points of one or more other mapping symbols and/or earlier final mapping symbols and are represented by complex-valued signal points or non-uniformly spaced amplitude levels.

A15. The probabilistic signal point shaping device as defined in any one of embodiments A11 to A14,
wherein said circuitry is configured to
assign bit labels to said final mapping symbols,
split bits of the bit labels of the final mapping symbols into first bits of first bit labels of the mapping symbols and second bits of second bit labels of the second mapping symbols,
determine first redundancy bits from the first bits of said first bit labels and second redundancy bits from the second bits of said second bit labels
combine the first redundancy bits and the second redundancy bits into combined redundancy bits, and
transform said combined redundancy bits into the redundancy rule.

A16. A probabilistic signal point shaping method comprising:
mapping data blocks of input bits of an input bit stream onto mapping symbols, wherein said mapping symbols are distributed according to a predetermined probability distribution and represented by complex-valued signal points or non-uniformly spaced amplitude levels,
assigning bit labels to said mapping symbols,
determining redundancy bits from the bits of said bit labels,
transforming said redundancy bits into a redundancy rule, and
applying the redundancy rule to the mapping symbols to obtain output symbols.

A17. A non-transitory computer-readable recording medium that stores therein a computer program product, which, when executed by a processor, causes the method according to embodiment A16 to be performed.

A18. A computer program comprising program code means for causing a computer to perform the steps of said method according to embodiment A16 when said computer program is carried out on a computer.

The invention claimed is:

1. A mapping device comprising circuitry configured to:
map data blocks of input bits of a first input bit stream onto first mapping symbols, wherein said first mapping symbols are distributed according to a first predetermined probability distribution and represented by first signal points,
analyze probability of occurrence of the first signal points representing the first mapping symbols and/or earlier final mapping symbols,
determine a second probability distribution to be applied for mapping second input bits of a second input bit stream onto second mapping symbols, said second probability distribution being determined based on the analyzed probability of occurrence such that a desired final probability distribution of final mapping symbols is obtained,
map data blocks of input bits of the second input bit stream onto the second mapping symbols, wherein said second mapping symbols are distributed according to said second probability distribution and represented by second signal points, and
combine the first mapping symbols and the second mapping symbols into the final mapping symbols.

2. The mapping device as claimed in claim 1,
wherein said circuitry is configured to configured to analyze the probability of occurrence of the first signal points of the first mapping symbols and/or earlier final mapping symbols by
counting the number of each first signal points and each earlier final mapping symbol, and
determining or updating the second probability distribution by considering said count of the first mapping symbols and/or the earlier final mapping symbols.

3. The mapping device as claimed in claim 1,
wherein said circuitry is configured to determine the second probability distribution by dividing each computed probability of occurrence of the final mapping symbols by the probability of occurrence of an associated first signal point of the first mapping symbols, wherein the association is determined by a combination rule defining combination of the first and second mappings symbols.

4. The mapping device as claimed in claim 1,
wherein said circuitry is configured to map the data blocks of the input bits of the first input bit stream onto real-valued first signal points and to map the data blocks of the input bits of the second input bit stream onto real-valued second signal points.

5. The mapping device as claimed in claim 4,
wherein said real-valued first mapping symbols are represented by non-uniformly spaced first amplitude levels and said real-valued second mapping symbols are represented by non-uniformly spaced second amplitude levels.

6. The mapping device as claimed in claim 1,
wherein said circuitry is configured to map the data blocks of the input bits of the first input bit stream onto complex-valued mapping symbols and to map the data blocks of the input bits of the second input bit stream onto complex-valued second mapping symbols.

7. The mapping device as claimed in claim 6,
wherein said complex-valued first mapping symbols are represented by non-uniformly spaced complex-valued first signal points of a signal point constellation and said complex-valued second mapping symbols are represented by non-uniformly spaced complex-valued second signal points of said signal point constellation.

8. The mapping device as claimed in claim 6,
wherein said circuitry is configured to map the data blocks of input bits of the first input bit stream onto complex-valued first mapping symbols arranged in a first predetermined area of the complex plane and map the data blocks of input bits of the second input bit stream onto complex-valued second mapping symbols arranged in a second predetermined area of the complex plane.

9. The mapping device as claimed in claim 8,
wherein said circuitry is configured to map the data blocks of input bits of the first input bit stream onto complex-valued first mapping symbols having a phase in a first predetermined range and/or an amplitude in a first predetermined range to map the data blocks of input bits of the second input bit stream onto complex-valued second mapping symbols having a phase in a second predetermined range and/or an amplitude in a second predetermined range.

10. The mapping device as claimed in claim 8,
wherein said circuitry is configured to map the data blocks of input bits of the first input bit stream onto complex-valued first mapping symbols arranged in a quadrant or octant and to map the data blocks of input bits of the second input bit stream onto complex-valued second mapping symbols arranged in a quadrant or octant.

11. The mapping device as claimed in claim 1,
wherein said circuitry is configured to combine the mapping symbols and the second mapping symbols by an invertible linear combination.

12. The mapping device as claimed in claim 1,
wherein said circuitry is configured to map data blocks of further input bit streams onto further mapping symbols, wherein said further mapping symbols are represented by further signal points and distributed according to a further probability distribution that is determined from an analysis of the probability of occurrence of signal points of one or more other mapping symbols and/or probability of occurrence of the earlier final mapping symbols.

13. A mapping method comprising
mapping data blocks of input bits of a first input bit stream onto first mapping symbols, wherein said first mapping symbols are distributed according to a first predetermined probability distribution and represented by first signal points,
analyzing the probability of occurrence of the first signal points representing the first mapping symbols and/or earlier final mapping symbols,
determining a second probability distribution to be applied for mapping second input bits of a second input bit stream onto second mapping symbols, said second probability distribution being determined based on the analyzed probability of occurrence such that a desired final probability distribution of final mapping symbols is obtained,
mapping data blocks of input bits of kg second input bit stream onto the second mapping symbols, wherein said second mapping symbols are distributed according to said second probability distribution and represented by second signal points, and
combining the first mapping symbols and the second mapping symbols into the final mapping symbols.

14. A probabilistic signal point shaping device comprising a mapping device as claimed in claim 1 and circuitry configured to:
assign bit labels to the final mapping symbols generated by the mapping device,
determine redundancy bits from bits of said bit labels,
transform said redundancy bits into a redundancy rule, and
applying the redundancy rule to the mapping symbols to obtain output symbols.

15. The probabilistic signal point shaping device as claimed in claim 14,
wherein said circuitry is configured to transform said redundancy bits into a multiplication factor of +1 or −1 as redundancy rule.

16. The probabilistic signal point shaping device as claimed in claim 14,
wherein said circuitry is configured to transform said redundancy bits into a phase rotation function and/or an amplitude multiplication function and/or a mirroring function as redundancy rule.

17. The probabilistic signal point shaping device as claimed in claim 14,
wherein said circuitry is configured to determine the redundancy bits from the bits of said bit labels and additional input bit and/or to multiply the output symbols with a scaling factor to obtain unity transmit power.

18. The probabilistic signal point shaping device as claimed in claim 14,
wherein said circuitry is configured to
assign bit labels to said final mapping symbols,
split bits of the bit labels of the final mapping symbols into a first bit stream comprising first bit labels of the mapping symbols and a second bit stream comprising second bit labels of the second mapping symbols,
determine first redundancy bits from the first bit stream and second redundancy bits from the second bit stream,
combine the first redundancy bits and the second redundancy bits into combined redundancy bits, and
transform said combined redundancy bits into the redundancy rule.

19. A probabilistic signal point shaping method comprising
a mapping method as claimed in claim 13,
assigning bit labels to the final mapping symbols generated by the mapping device,
determining redundancy bits from the bits of said bit labels,
transforming said redundancy bits into a redundancy rule, and applying the redundancy rule to the mapping symbols to obtain output symbols.

20. A non-transitory computer-readable recording medium that stores therein a computer program product, which, when executed by a processor, causes the method according to claim 13 or 19 to be performed.

* * * * *